Figure 1:
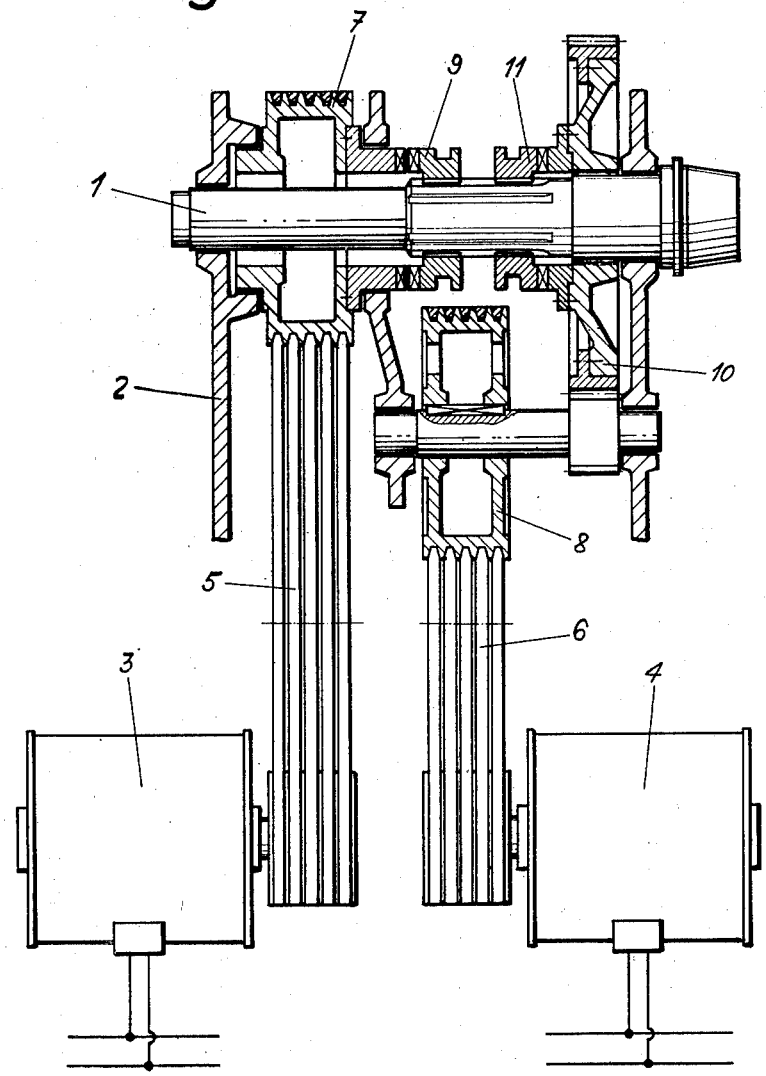

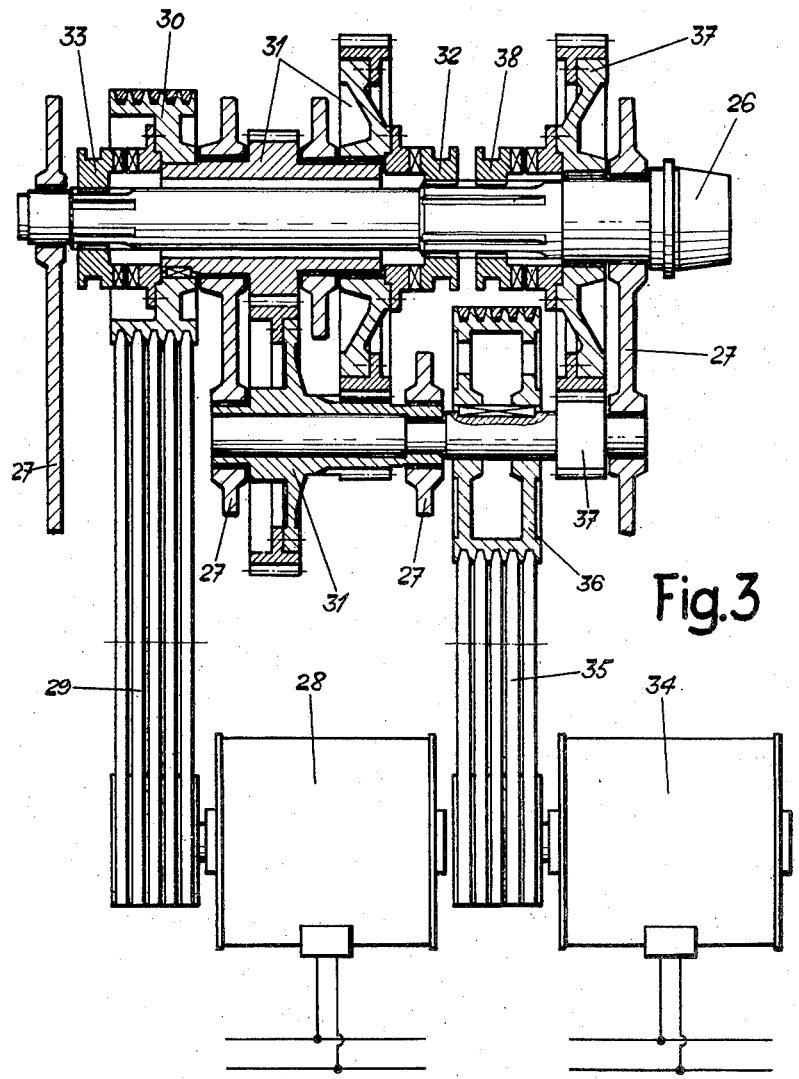

United States Patent Office 2,792,723
Patented May 21, 1957

2,792,723

CONTINUOUS CONTROLLABLE TWO MOTOR DRIVE

Ottomar Von Zelewsky, Neuhausen am Rheinfall, Switzerland, assignor to Georg Fischer Aktiengesellschaft, Schaffhausen, Switzerland, a Swiss company Application October 9, 1953, Serial No. 385,213

Claims priority, application Switzerland October 11, 1952

4 Claims. (Cl. 74—722)

The present invention relates to a continuous controllable two-motor drive particularly for machine tools, such as for lathes. The method of constructing infinitely variable drives for feeds in machine tools by means of using two motors is well-known. The range of spindle revolutions required with modern lathes is so great that it provokes a drop in output when the rotational speed is low, if a single motor is used. In contrast to this, the present invention is distinguished by the fact that the whole range of revolutions is divided up into at least two slightly overlapping working ranges of the two alternately operating motors, and the motor which is not under load is disconnected from the driven machine part by a clutch.

In cases where the required range of revolutions also includes very low rotational speeds, the torque being high, the use of single-stage or two-stage back gears is advantageous.

Figure 2:
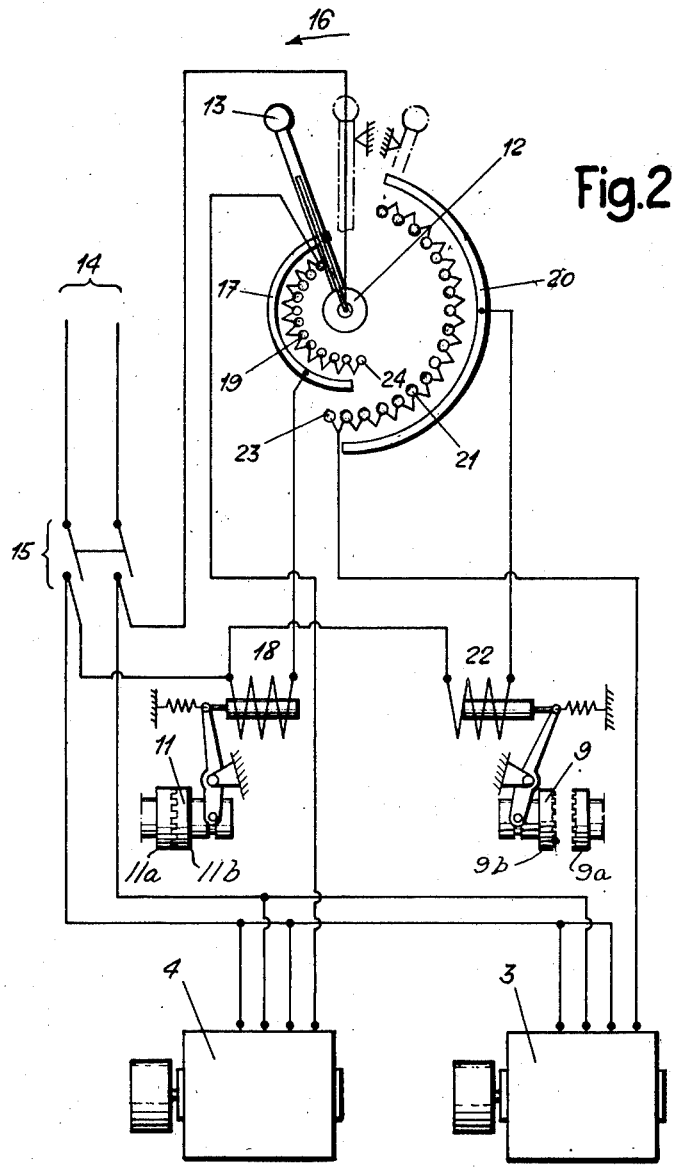

Two typical examples of the invention are illustrated in the drawings. They show:

Fig. 1 a two-motor drive with a single back gear,
Fig. 2 a diagram of the electrical control for the drive as shown in Fig. 1,
Fig. 3 a two-motor drive with a single and a double back gear.

In Figs. 1 and 2 number 1 indicates the spindle of a lathe; two parts of the walls of the headstock of the said lathe are shown in section. Two infinitely variable motors 3 and 4 drive the V-belt pulleys 7 and 8 via multiple V-belts 5 and 6. The V-belt pulley 7 can be connected with the spindle 1 via the releasable clutch 9 having clutch members 9a and 9b. The V-belt pulley 8 drives the said spindle 1 via the back gear 10 and the releasable clutch 11 having clutch members 11a and 11b. Fig. 2 is a typical diagram of the electrical control for this single drive. The common starting resistance 12 is actuated manually by means of the starting lever 13. From the mains 14 the current is switched in via the main switch 15. In Fig. 2 the zero position of the starting lever 13 is represented by dotted lines. Starting is effected by swivelling the starting lever 13 in the direction of the arrow 16. First of all the starting lever 13 puts into circuit via the slip ring 17 the magnet coil 18 and thus actuates the clutch 11. Shortly afterwards the starting lever 13 reaches the contact studs 19 with the starting resistances for the motor 4. The rotational speed of the motor 4 is now increased until the starting lever 13 has reached its lowest position. In the present typical example the motor has infinitely varied its rotational speed from a minimum of 200 to a maximum of 800 revolutions per minute. The spindle 1 has, corresponding to the ratio 1:5 of the back gear 10 and to the ratio 1:2 of the V-belt drive, increased its number of revolutions from 20 to 80. In the lowest position, which is diametrically opposite to the zero position, the starting lever 13 puts into circuit via the slip ring 20 the magnet coil 22 and thereby actuates the clutch 9. Immediately prior to that, the motor 3 has been brought up to its minimum number of revolutions of 160 by means of the starting button 23. Via the V-belt drive 6 with the ratio 1:2 the V-belt pulley 7 is now also driven at 80 revolutions per minute, so that the clutch 9 mechanically engages both the synchronously rotating parts of the spindle 1 and of the V-belt pulley 7. For a short time both the motors 3 and 4 act on the spindle 1. When the starting lever 13 is swivelled further in the direction of the arrow 16 the magnet coil 18 of the clutch 11 is cut-out and thereby the clutch 11 is disengaged. The motor 4 is now disconnected from the spindle 1 and is duly cut-out by actuating the starting button 24. By means of the starting resistances, which are operated by the contact studs 21, the rotational speed of the motor 3 can be increased from 160 to 500 revolutions per minute. In all, the spindle 1 has increased its rotational speed from 20 to 250 revolutions per minute; this has happened in two ranges, from 20 to 80 revolutions per minute with the motor 4 under load, and from 80 to 250 revolutions per minute with the motor 3 under load. The typical example illustrated in Figs. 1 and 2 shows a case in which the driven machine part is driven directly by one of the motors, and via a back gear by the other. The typical example given in Figs. 1 and 2 shows further that a common control mechanism is provided for setting the speed of the two motors 3 and 4, and for actuating the two clutches 9 and 11.

Figure 3 shows a two-motor drive with a single and a double back gear, it being also possible to couple one or other of these motors directly with the driven machine part. In Fig. 3 number 26 indicates a lathe spindle; number 27 denotes parts of the headstock of said lathe. An infinitely variable motor 28 acts via a V-belt drive 29 on a V-belt pulley 30 which is firmly connected with the double back gear 31. The double back gear 31 can be coupled with the spindle 26 by means of the clutch 32. On the other hand, the V-belt pulley 30 can also be directly coupled with the spindle 26 by means of a clutch 33. The second infinitely variable motor 34 acts via a V-belt drive 35 on the V-belt pulley 36. The latter is firmly connected with the single back gear 37. The large wheel of the back gear 37 can be coupled with the spindle 26 by a shiftable clutch 38. The mode of operation of the typical example shown in Fig. 3 is as follows:

The total range of revolutions of the spindle 26 is divided up into three ranges. The motor 28 locks after the first range from the lowest number of revolutions up to about $$n_{min} \times \sqrt[3]{\frac{n_{max}}{n_{min}}}$$

the clutch 32 being engaged, so that the V-belt pulley 30 transmits the torque to the spindle 26 via the double back gear 31 and the clutch 32. The second range from $$n_{min} \times \sqrt[3]{\frac{n_{max}}{n_{min}}}$$

to $$n_{min} \left[ \times \sqrt[3]{\frac{n_{max}}{n_{min}}} \right]^2$$

of the rotational speeds is taken over by the motor 34 by means of the V-belt drive 35, V-belt pulley 36 and single back gear 37 which is coupled with the spindle 26 by the clutch 38. On changing over from motor 28 to motor 34, both the clutches 32 and 38 are engaged for a short time; the clutch 32 is disengaged shortly afterwards and the motor 28 reduced to the starting speed. At approximately $$n_{min} \cdot \left[\sqrt[3]{\frac{n_{max}}{n_{min}}}\right]^2$$

of the range of revolutions there is another change over from motor 34 to motor 28. The latter now takes over the third part of the range of revolutions, transmission from the V-belt pulley 30 on to the spindle 26 being effected directly by means of the clutch 33. On changing over from motor 34 to motor 28 both the clutches 38 and 33 are again engaged simultaneously for a short time. Shortly afterwards the clutch 38 is disengaged.

Any type of infinitely variable motors can be used as motors for the two-motor drive envisaged in the present invention. For clutches it is advantageous to use shiftable friction, jaw clutch or over-running couplings. By the use of a releasable clutch a two-motor drive of the type described can command a wider range of revolutions which can be controlled under load, the output remaining constant, than has been possible with an infinitely variable electric motor of the type known hitherto.

When two motors are used, only the range of revolutions of one motor is utilized, said range being variable while the output remains constant. Consequently, in the case of the present invention, for example, the total range of revolutions of a lathe can be utilized at low rotational speeds without any drop in output.

What I claim is:

1. An infinitely variable drive for a machine tool having a driven member, two clutches each of said clutches having a clutch element connected with said driven member and another clutch element, a motor driven with a specific working range, another alternately operating motor driven with a different working range, the two working ranges slightly overlapping each other, means operatively connecting the first-mentioned motor with said other clutch element of one of said clutches, means operatively connecting said other motor with said other clutch element of the other one of said clutches, and means actuating said clutches to consecutively connect the first-mentioned motor with said driven member, then connect said other motor with said driven member and then disconnect the first-mentioned motor from said driven member, whereby the entire range of revolutions of the driven member is divided into two slightly overlapping working ranges.

2. An infinitely variable drive for a machine tool having a driven member, two clutches each of said clutches having a clutch element connected with said driven member and another clutch element, a motor driven with a specific working range, another alternately operating motor driven with a different working range, the two working ranges slightly overlapping each other, means operatively connecting the first-mentioned motor with said other clutch element of one of said clutches, means operatively connecting said other motor with said other clutch element of the other one of said clutches, and a common control mechanism for setting the rotational speed of the two motors and actuating the two clutches to consecutively connect the first-mentioned motor with said driven member, then connect said other motor with said driven member and then disconnect the first-mentioned motor from said driven member, whereby the entire range of revolutions of the driven member is divided into two slightly overlapping working ranges.

3. An infinitely variable drive for a machine tool having a driven member, two clutches, each of said clutches having a clutch element connected with said driven member and another clutch element, a motor driven with a specific working range, another alternately operating motor driven with a different working range, the two working ranges slightly overlapping each other, means directly connecting the first-mentioned motor with said other clutch element of one of said clutches, a back gear connected with said other clutch element of the other one of said clutches, means operatively connecting said other motor with said back gear, and means actuating said clutches to consecutively connect the first-mentioned motor with said driven member, then connect said other motor with said driven member and then disconnect the first-mentioned motor from said driven member, whereby the entire range of revolutions of the driven member is divided into two slightly overlapping working ranges.

4. An infinitely variable drive for a machine tool having a driven member, three clutches, each of said clutches having a clutch element connected with said driven member and another clutch element, a motor driven with a specific working range, another alternately operating motor driven with a different working range, the two working ranges slightly overlapping each other, a back gear connected with said other clutch element of one of said clutches, another back gear connected with said other clutch element of the second one of said clutches, means operatively connecting the first-mentioned motor with the first-mentioned back gear and also directly connecting the first-mentioned motor with said other clutch element of the third clutch, means operatively connecting said other motor with said other back gear, and means actuating said clutches to consecutively connect the first-mentioned motor with said driven member, then connect said other motor with said driven member and then disconnect the first-mentioned motor from said driven member, whereby the entire range of revolutions of the driven member is divided into two slightly overlapping working ranges.

References Cited in the file of this patent

UNITED STATES PATENTS

| | | |
|---|---|---|
| 1,990,810 | Young | Feb. 12, 1935 |
| 2,393,010 | Arnold et al. | Jan. 15, 1946 |
| 2,488,069 | Spalding | Nov. 15, 1949 |